United States Patent [19]
Patterson

[11] Patent Number: 6,086,001
[45] Date of Patent: Jul. 11, 2000

[54] APPARATUS AND METHOD FOR PROCESSING, CREATING AND DISPENSING A ROUGHAGE RATION

[76] Inventor: R. C. Patterson, Box 147, Kim, Colo. 81049

[21] Appl. No.: 09/245,546

[22] Filed: Feb. 5, 1999

[51] Int. Cl.[7] .............................. B02C 18/06; B02C 18/22
[52] U.S. Cl. .................. 241/27; 241/28; 241/34; 241/101.76; 241/186.1; 241/186.2; 241/186.35; 241/605
[58] Field of Search .......................... 241/101.76, 186.1, 241/186.2, 186.35, 280, 605, 27, 28, 34

[56] References Cited

U.S. PATENT DOCUMENTS

| | | | |
|---|---|---|---|
| 2,221,266 | 11/1940 | Roach | 275/6 |
| 2,685,900 | 8/1954 | Cross | 146/118 |
| 2,941,505 | 6/1960 | Middlen | 119/51 |
| 3,035,729 | 5/1962 | Soares et al. | 214/519 |
| 3,168,291 | 2/1965 | Knoedler et al. | 259/9 |
| 3,184,108 | 5/1965 | Grau | 222/58 |
| 3,254,878 | 6/1966 | Lorenzen | 259/8 |
| 3,265,227 | 8/1966 | Vratil et al. | 214/83.32 |
| 3,379,417 | 4/1968 | Luscombe | 259/6 |
| 3,863,850 | 2/1975 | Freeman | 241/186.4 X |
| 3,897,018 | 7/1975 | Wilkes et al. | 241/223 |
| 3,926,378 | 12/1975 | Ryan | 241/154 |
| 3,999,674 | 12/1976 | Meitl | 241/101.76 X |
| 3,999,675 | 12/1976 | Meitl | 214/83.14 |
| 4,428,537 | 1/1984 | Von der Heide | 241/101 |
| 4,561,781 | 12/1985 | Seymour | 366/132 |
| 4,688,729 | 8/1987 | Hobson, Sr. | 241/101.7 |
| 4,907,538 | 3/1990 | Helmle et al. | 119/51.01 |
| 5,209,413 | 5/1993 | Dwyer et al. | 241/101.7 |
| 5,573,190 | 11/1996 | Goosen | 241/27 |
| 5,626,298 | 5/1997 | Arnoldy | 241/101.76 |
| 5,718,188 | 2/1998 | Erickson | 119/57.9 |

*Primary Examiner*—John M. Husar
*Attorney, Agent, or Firm*—John E. Toupal; Harold G. Jarcho

[57] ABSTRACT

A machine adapted to be towed by a tractor and powered by the PTO and hydraulic power system of the tractor for transporting, processing and blending two different types of roughage of substantial size and weight into a desired ratio for a more efficient and economical nutritional balance and better palatability as well as dispensing the ratio to livestock. This improved machine is characterized by two independently hydraulically driven floor chains that are each capable of carrying a large bale (or bales) of roughage through a series of vertically aligned shredders at different rates of speed. This produces a blend of differing types of roughage consistent with the desired nutritional component considered most economical and efficient for the particular livestock being fed. The processed ration is dropped onto a conveyor chain and immediately delivered into feed bunks for livestock consumption. The shredders and conveyor chain are mechanically driven. The variable speed of one hydraulically driven floor chain is controlled by a flow control divertor, while the speed of the other hydraulically driven floor chain remains constant.

21 Claims, 3 Drawing Sheets

APPARATUS AND METHOD FOR PROCESSING, CREATING AND DISPENSING A ROUGHAGE RATION

CROSS-REFERENCE TO RELATED APPLICATIONS

Not applicable.

BACKGROUND

1. Field of the Invention

The present invention relates to processing roughage, creating a ration, and delivering it to livestock.

2. Description of Prior Art

In modern agriculture practice, it is considered advantageous to process roughage to be fed to livestock. It is also considered advantageous to use more than one feed source to create a ration to provide the animals' proper nutritional requirements. It is further necessary to deliver the ration to the animals.

U.S. Pat. Nos. 2,221,266 to Roach (1939), 2,685,900 to Cross (1954), 2,941,505 to Middlen (1960), 3,035,729 to Soares et al (1962), 3,379,417 to Luscombe (1968), and 3,999,674 to Meitl (1976) all provide various means of processing only one type of roughage and delivering it to livestock, but they do rot create a ration.

U.S. Pat. Nos. 3,168,291 to Knoedler et al (1965), 3,184,108 to Grau (1965), 3,265,227 to Vratil et al (1966), 4,561,781 to Seymour (1985), 4,907,538 to Helmle et al (1990), and 5,718,188 to Erickson (1998) all employ various methods of blending a grain ration and delivering it to livestock. They, however, do not process it, and they will not work on large bales of roughage.

U.S. Pat. No. 3,254,878 to Lorenzen (1966) employs a method to process and deliver a grain ration to livestock. However, it will not work on large bales of roughage.

U.S. Pat. No. 4,428,537 to Heide (1984) employs a method of processing, blending, and delivering a silage and grain ration, but it will not work on large bales of roughage.

U.S. Pat. No. 5,626,298 to Arnoldy (1997) does process large bales of roughage, but does not create a ration or deliver it to livestock.

SUMMARY

The present invention provides a machine and method of processing large bales of roughage white simultaneously creating a ration and immediately delivering the ration to livestock ready for consumption.

OBJECTS AND ADVANTAGES

Accordingly, several objects and advantages of my invention are:

(a) to provide a machine to process large bales of hay or roughage;

(b) to provide a machine that creates a ration of varying ratios from two different types of roughage;

(c) to provide a machine that immediately delivers a roughage ration to livestock ready for consumption;

(d) to provide a machine which blends cheaper, lower quality, roughage with higher quality roughage to create a more effective and economical ration;

(e) to provide one machine which performs the functions that previously required two or more machines;

(f) to provide a machine to reduce the amount of time and labor required to process large bales of roughage, create a ration, and deliver the ration to livestock.

Still further objects and advantages will become apparent from a consideration of the ensuing description and drawings.

DRAWING FIGURES

In the drawings, closely related figures have the same number but different alphabetic suffixes.

REFERENCE NUMERALS IN DRAWINGS

| 10 | PTO shaft | 11A | shaft |
|---|---|---|---|
| 11B | shaft | 11C | right-angle gear box |
| 11D | gear box | 12 | double-out gear box |
| 13 | shaft | 14 | right-angle gear box |
| 15A | idler gear | 15B | Idler gear |
| 15C | idler shaft | 16 | conveyor chain |
| 17A | drive gear | 17B | drive gear |
| 17C | drive shaft | 18L | right-angle gear box |
| 18R | right-angle gear box | 19A | drive gear |
| 19B | drive gear | 19C | drive gear |
| 19D | drive gear | 20L | hydraulic motor |
| 20R | hydraulic motor | 21R | drive shaft |
| 21L | drive shaft | 22 | gear |
| 24A | chain | 24B | chain |
| 24C | chain | 26A | gear |
| 26B | gear | 28 | shredder |
| 30R | floor chain | 30L | floor chain |
| 32A | idler gear | 32B | idler shaft |
| 32C | idler gear | 32D | idler gear |
| 32E | idler shaft | 32F | idler gear |
| 34 | trailer | 36 | wheel |
| 38 | hood | 40 | discharge opening |
| 42A | hydraulic hose | 42B | hydraulic hose |
| 42C | hydraulic hose | 42D | hydraulic hose |
| 42E | hydraulic hose | 44 | flow control divertor |
| 46 | floor | | |

DESCRIPTION

Figure 1:
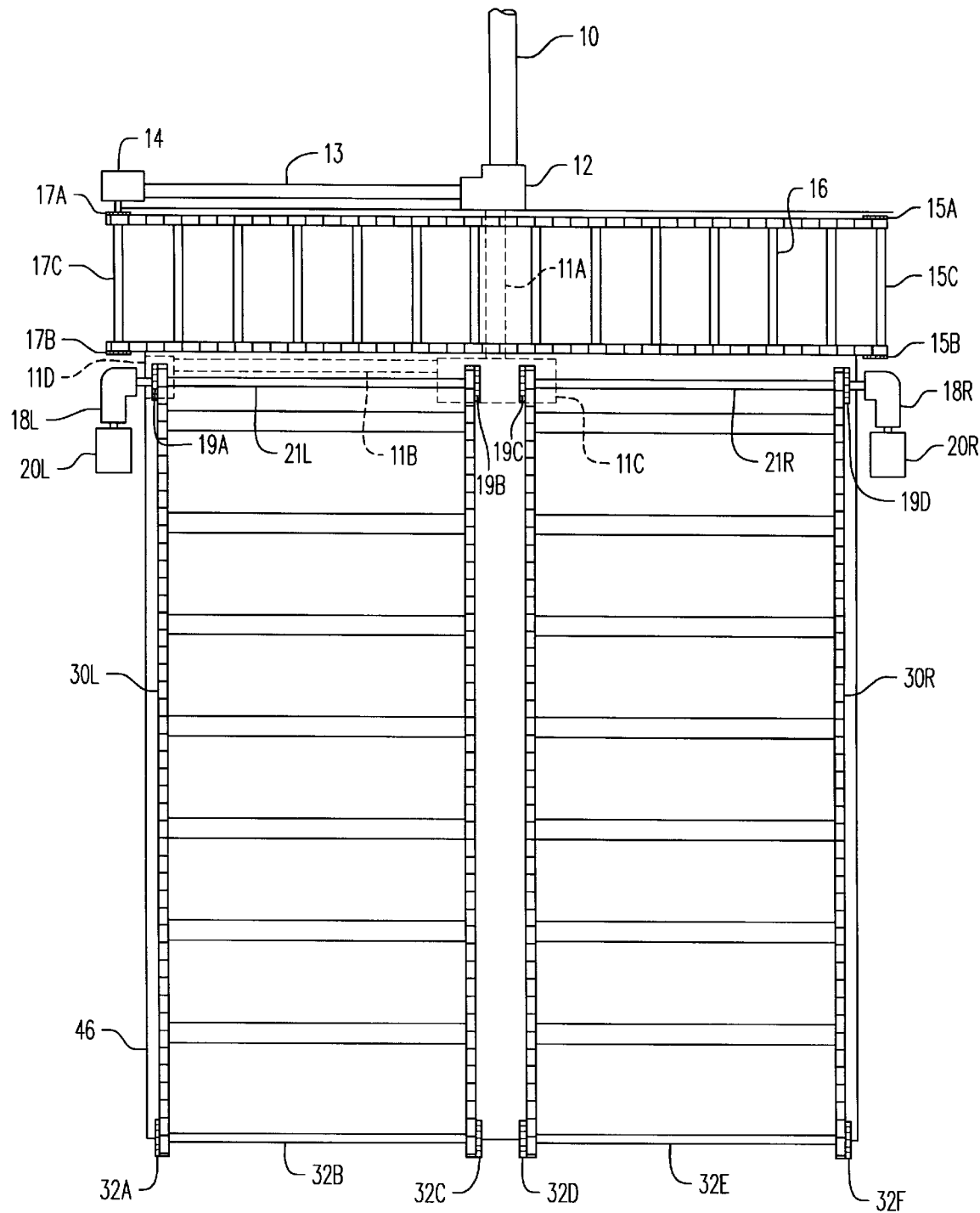
FIG. 1 is a top view of the ration processing and distributing wagon. Some details have been omitted for clarity.
Figure 2:
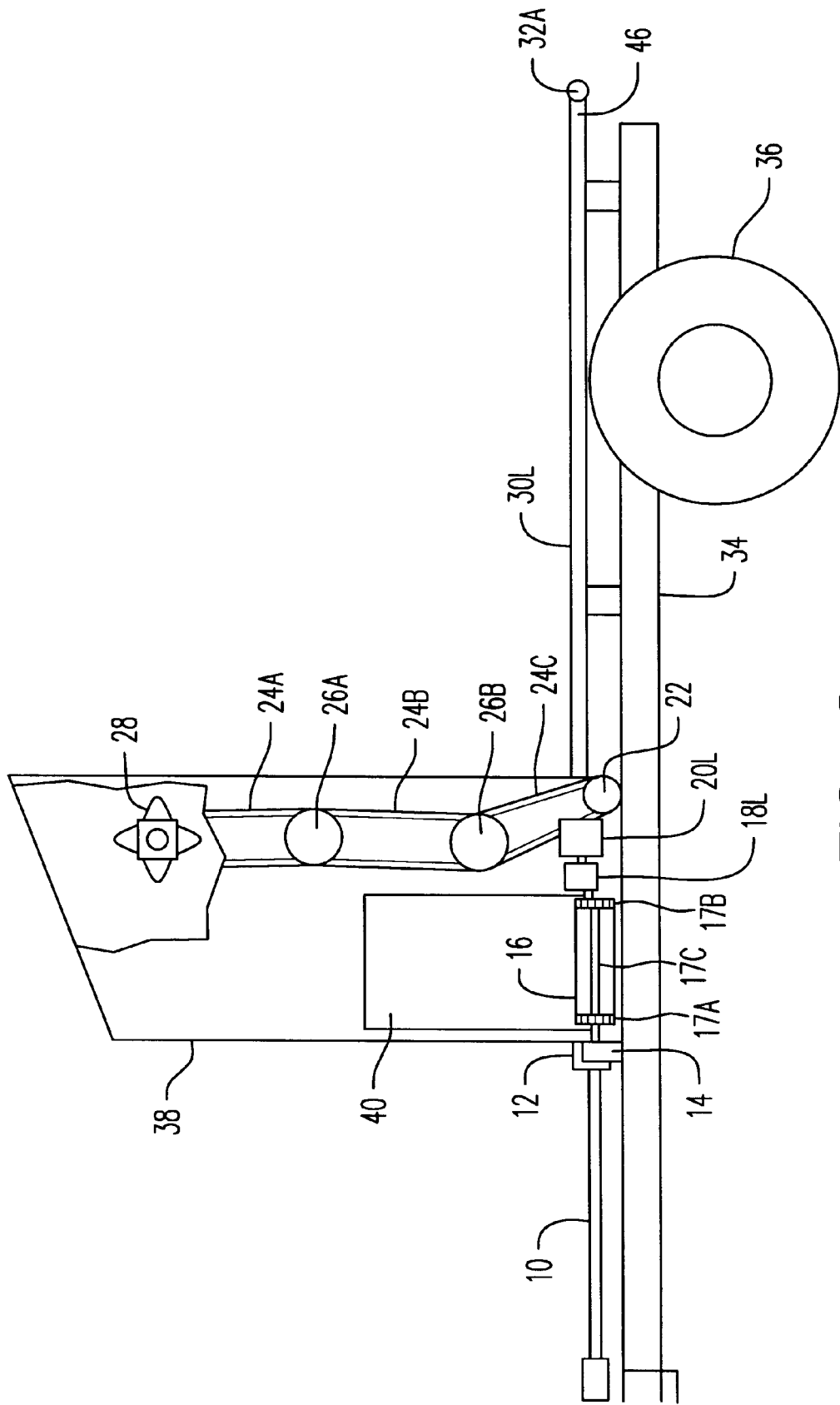
FIG. 2 is a side view of the ration processing and distributing wagon.
Figure 3:
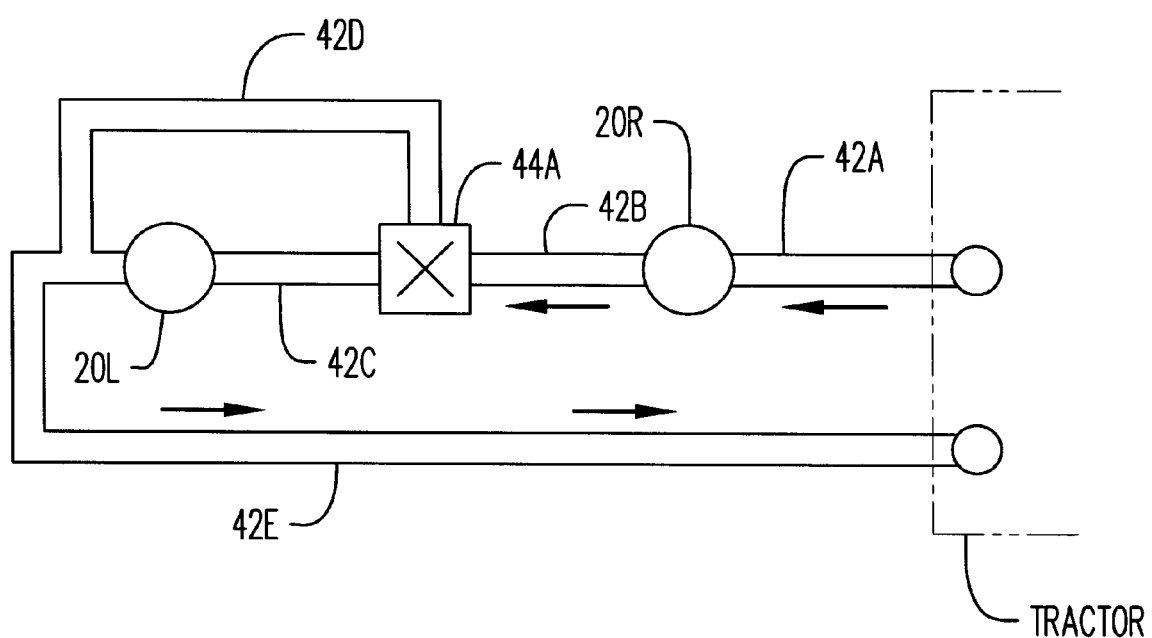
FIG. 3 is a view of the preferred embodiment of the schematics of the hydraulic system of the machine.

FIGS. 1–3 Preferred Embodiment

A preferred embodiment of the present invention is illustrated in FIG. 1 (top view) and FIG. 2 (side view). In FIG. 1, a mobile frame 34 with wheels 36 (FIG. 2) includes first and second parallel conveyor chains 30L and 30R, turning on idler gears 32A, 32C, 32D, 32F, and idler shafts 32B and 32E and driven by drive gears 19A, 19B, 19C, 19D and drive shafts 21L and 21R which are connected to right-angle gear boxes 18L and 18R which are connected to hydraulic motor 20L and hydraulic motor 20R. A third conveyor chain 16 is directed transversely to the first and second chains 30L, 30R and turns on idler gears 15A, 15B, and idler shaft 15C and is driven by drive gears 17A, 17B, attached to drive shaft 17C which is connected to right-angle gear box 14 which is connected to shaft 13 which is connected to double-out gear box 12 which is connected to PTO shaft 10 which is connected to tractor PTO power out-put shaft (not shown).

In FIG. 2, the mobile frame 34 includes a transport hood 38 which covers three vertically spaced apart shredders 28, driven by, respectively, chains 24A, 24B, and 24C and gears 26A and 26B which are driven by gear 22 which is connected to gear box 11D which is connected to shaft 11B which is connected to right-angle gear box 11C which is connected to shaft 11A which is connected to double-out gear box 12 which is driven by PTO shaft 10 which connects to PTO out-put shaft on tractor (not shown). Conveyor chain 16 discharges processed ration through discharge opening 40.

In FIG. 3, hydraulic hose 42A connects tractor hydraulic system (not shown) to hydraulic motor 20R which is connected to hydraulic hose 42B connected to flow control divertor 44A which is connected to hydraulic hose 42C connected to hydraulic motor 42L connected to hydraulic hose 42E which is connected to return side of hydraulic system on tractor (not shown). Hydraulic hose 42D connects flow control divertor to hydraulic hose 42E.

Operation—FIGS. 1, 2, and 3

FIG. 1 shows two continuous floor chains 30R and 30L. Each one is wide enough to carry a large bale of roughage. The length of floor chains 30R and 30L can vary to hold any number of bales from one to four in succession. Floor chain 30R is deposed between idler gear 32F and 32D and idler shaft 32E and drive gears 19C and 19D which are secured to drive shaft 21R which is driven through right-angle gear box 18R by hydraulic motor 20R.

Activation of hydraulic motor 20R is shown in FIG. 3. Hydraulic hose 42A carries pressurized hydraulic fluid from tractor hydraulic system (not shown) to hydraulic motor 20R. When the tractor hydraulics are activated the bale, or bales, on floor chain 30R will move forward at a given speed to be processed by shredders 28 shown best in FIG. 2.

Shredders 28 are turned by chains 24C, 24B, and 24A and gears 26A and 26B. Gear 22 is powered by tractor PTO through PTO shaft 10, double-out gear box 12, shaft 11B, right-angle gear box 11C, shaft 11A, and gear box 11D. Hood 38 contains the processed roughage and allows it to fall on conveyor chair 16 which is deposed between idler gears 15A, 15B and idler shaft 15C and drive gears 17A and 17B which are turned by drive shaft 17C, turned by right-angle gear box 14, turned by shaft 13, turned by double-out gear box 12, turned by PTO shaft 10, which is turned by tractor PTO out-put shaft (not shown). The conveyor chain 16 delivers the processed roughage through opening 40.

Pressurized hydraulic fluid passes through hydraulic motor 20R, causing it to be activated. It is then routed through hydraulic hose 42B (best shown in FIG. 3) to flow control divertor 44A. The pressurized hydraulic fluid is then channeled through hydraulic hose 42C to hydraulic motor 20L which turns right-angle gear box 18L (best illustrated in FIG. 1) which turns drive shaft 21L which turns drive gears 19A and 19B which move floor chain 30L forward. Floor chain 30L is a continuous floor chain and deposed between drive gears 19A and 19B and idler gears 32A and 32C and idler shaft 32B. The bale, or bales, on floor chain 30L would preferably consist of a bale of roughage differing in nutritional value than the bale, or bales, on floor chain 30R. Varying amounts of pressurized hydraulic fluid are diverted around hydraulic motor 20L (best illustrated in FIG. 3) by flow control divertor 44A through hydraulic hose 42D and returned through hydraulic hose 42E to return side of tractor hydraulic system (not shown). The speed that hydraulic motor 20L turns will vary according to the amount of pressurized hydraulic fluid diverted around, rather than through, hydraulic motor 20L. By this process, the predetermined speed at which the bales are carried to shredder 28 (FIG. 2) on floor chain 30L will vary from the given speed at which the bales on floor chain 30R are carried to shredders 28. Thus, the percentage of roughage on floor chain 30L that has been processed by shredders 28 can be varied from the percentage of roughage on floor chain 30R that has been processed by shredders 28. Conveyor chain 16 delivers the processed ration through opening 40 and deposits it into a feed bunk ready for livestock consumption.

Floor 46 (FIG. 2) is connected to trailer 34 which rides on wheels 36 which allows the invention to be pulled by a tractor and deliver the feed ration to livestock for consumption immediately after being processed.

CONCLUSION, RAMIFICATIONS, AND SCOPE

This invention will reduce the number of machines and the man hours required to meet the nutritional needs of livestock being fed solely, or mostly, roughage. This invention can more efficiently and economically combine large bales of roughage of differing nutritional values in varied ratios while increasing the palatability of the feed by processing it and providing immediate delivery of the ration to the livestock.

While my above description contains many specificities, they should not be construed to as limitations on the scope of the invention, but rather as an exemplification of one preferred embodiment thereof. Many other variations are possible. For example, the whole invention can be mounted on a trick for additional mobility. An additional flow control divertor can be added to make the speed of both floor chains adjustable. An additional flow control divertor and hydraulic motor can be added to run the dispensing conveyor chain instead of the PTO drive. A grain bin and auger system can be added to supply grain to the ration. The hydraulic schematics can be run individually and through flow divertors rather than through a series. Pulleys and belts can be used in place of gears and chains.

Accordingly, the scope of the invention should be determined not by the embodiment illustrated, but by the appended claims and their legal equivalents.

I claim:

1. Roughage processing and dispensing apparatus for feeding livestock and comprising:
    a mobile frame defining a floor section for supporting a plurality of bales of roughage, a shredder section in which the bales are shredded, and a discharge section for discharging roughage shredded in said shredder section;
    shredder means disposed in said shredder section;
    a first conveyor for moving at least one of the bales into said shredder means at a given speed;
    a second conveyor for moving at least another of the bales into said shredder means at a predetermined speed;
    drive means operable to provide simultaneous movement of said first conveyor and said second conveyor and resultant simultaneous movement of the one and another bales into said shredder section; and
    a control system for varying said given speed relative to said predetermined speed.

2. Apparatus according to claim 1 including a conveyor system arranged to receive from said shredder means the shredded contents of the one and another bales, and to transport the contents to said discharge section.

3. Apparatus according to claim 2 wherein said first conveyor and said second conveyor are arranged to move the one and another bales in substantially parallel directions.

4. Apparatus according to claim 3 wherein said conveyor system is arranged to transport the shredded contents in a direction transverse to said parallel directions.

5. Apparatus according to claim 4 wherein said drive means comprises a first hydraulic motor mechanically coupled to said first conveyor, and a second hydraulic motor mechanically coupled to said second conveyor; and said control system comprises a hydraulic system fluid coupled to said first and second hydraulic motors and adapted to provide independent speed control thereof.

6. Apparatus according to claim 5 wherein said shredder means comprises a plurality of substantially vertically spaced apart shredders.

7. Apparatus according to claim 6 wherein said first conveyor and said second conveyor are horizontally spaced apart.

8. Apparatus according to claim 7 wherein said mobile frame is adapted for towing by a tractor, said conveyor system comprises a PTO shaft for coupling with the tractor, and said hydraulic system comprises hydraulic hoses for connection to the tractor.

9. Apparatus according to claim 3 wherein said mobile frame is adapted to move in a path aligned with said parallel directions.

10. A roughage bale processing and dispensing method comprising the following steps:
selecting one bale of roughage having given nutritional value;
selecting another bale of roughage having predetermined nutritional value substantially different than said given nutritional value;
conveying said one bale into a shredder mechanism at a given speed;
simultaneously conveying said another bale into the shredder mechanism at a predetermined speed different than said given speed; and
combining the resultant shredded contents of said one bale and said another bale.

11. A method according to claim 12 wherein said conveying step comprises the steps of loading the one bale onto a first conveyor arranged to feed the one bale into the shredder mechanism, loading the another bale onto a second conveyor arranged to feed the another bale into the shredder mechanism, and controlling the ratio of said given speed to said predetermined speed.

12. A method according to claim 11 wherein said combining step comprises the step of feeding the shredded contents onto a third conveyor arranged to convey the contents to a discharge region.

13. A method according to claim 12 including the steps of arranging the first conveyor and the second conveyor for movement in parallel directions.

14. A method according to claim 13 including the step of arranging the third conveyor for movement transverse to said parallel directions.

15. A method according to claim 10 including the step of distributing the combined and shredded contents.

16. A method according to claim 15 wherein said conveying step comprises the steps of loading the one bale onto a first conveyor arranged to feed the one bale into the shredder mechanism, loading the another bale onto a second conveyor arranged to feed the another bale into the shredder mechanism, and controlling the ratio of said given speed to said predetermined speed.

17. A method according to claim 16 wherein said combining step comprises the step of feeding the shredded contents onto a third conveyor arranged to convey the contents to a discharge region.

18. A method according to claim 17 including the steps of mounting the first conveyor, second conveyor and third conveyor on a mobile frame; and said distributing step comprises moving the mobile frame along a distribution path.

19. A method according to claim 18 wherein said mounting step comprises the steps of arranging the first conveyor and the second conveyor for movement in parallel directions substantially aligned with the path of movement of the mobile frame.

20. A method according to claim 19 wherein said mounting step further comprises the step of arranging the third conveyor for movement transverse to said parallel directions.

21. A method according to claim 10 wherein said given nutritional value is greater than said predetermined nutritional value, and said predetermined speed is greater than said given speed.

* * * * *

UNITED STATES PATENT AND TRADEMARK OFFICE
CERTIFICATE OF CORRECTION

PATENT NO. : 6,086,001
DATED : July 11, 2000
INVENTOR(S) : R. C. Patterson

It is certified that error appears in the above-identified patent and that said Letters Patent is hereby corrected as shown below:

Column 4, line 24, "trick" should read --truck--.

Signed and Sealed this

First Day of May, 2001

Attest:

NICHOLAS P. GODICI

Attesting Officer

Acting Director of the United States Patent and Trademark Office